Patented Oct. 10, 1922.

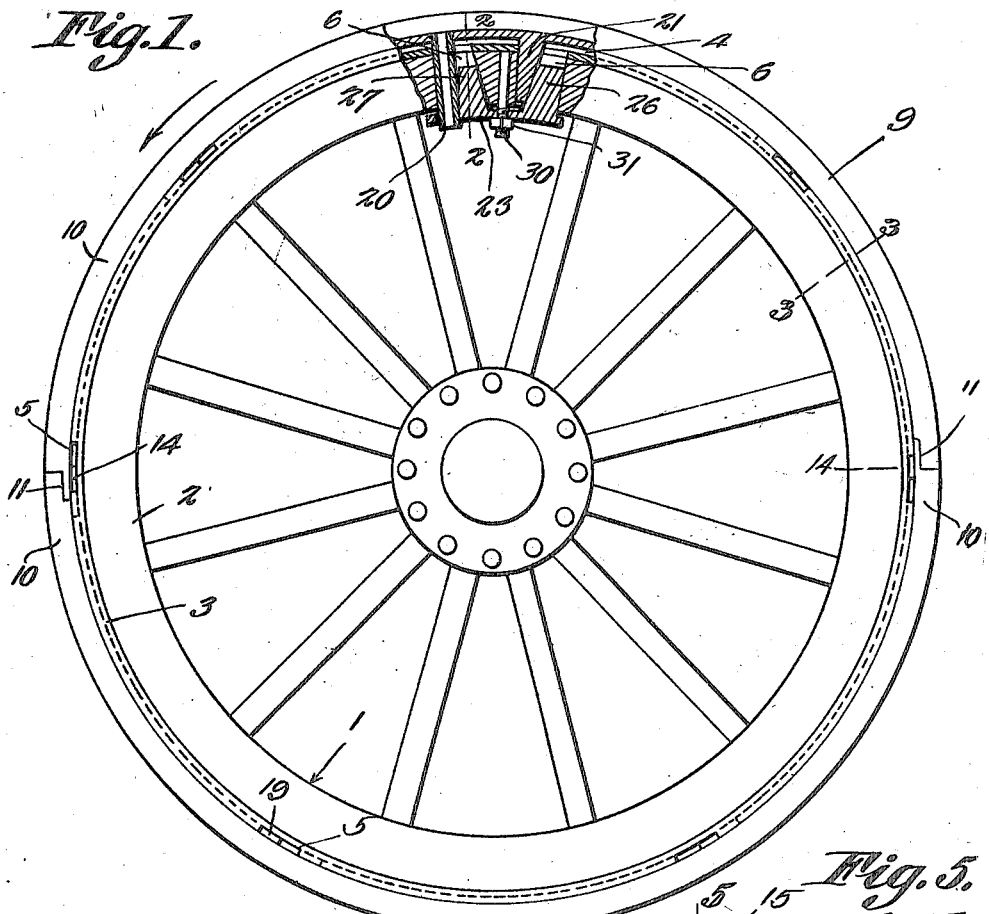

1,431,457

UNITED STATES PATENT OFFICE.

LEO FEBRE, OF EXPO, VIRGINIA.

WHEEL RIM.

Application filed February 7, 1921. Serial No. 443,241.

*To all whom it may concern:*

Be it known that I, LEO FEBRE, a citizen of the United States, residing at Expo, in the county of Norfolk and State of Virginia, have invented a new and useful Wheel Rim, of which the following is a specification.

This invention aims to provide means for holding a rim securely but releasably on a wheel body.

In the drawings:—

Figure 1 shows in side elevation, a wheel body carrying the device forming the subject matter of this application, parts appearing in section; Figure 2 is a section on the line 2—2 of Figure 1; Figure 3 is a section on the line 3—3 of Figure 1; Figure 4 is a fragmental view disclosing the inner surface of the demountable rim; and Figure 5 is a section on the line 5—5 of Figure 4.

The numeral 1 designates a wheel body, comprising a felly 2 and a felly band 3. The felly band 3 has a circumferential groove 4. Lateral passages 5 are fashioned in the felly band 3, and communicate at their inner ends with the groove 4. Radial openings 6 are formed in the felly 2 and the felly band 3. Noting Figure 2, one wall 8 of each of the openings 6 is inclined transversely of the wheel body, so that the openings are slightly larger at the outer curve of the wheel body than at the inner curve of the wheel body.

The numeral 9 denotes a demountable rim made up of sections 10, the ends of which are halved together as at 11. One end of each section 10 carries a pivot element 12 whereon a latch 14 is mounted to swing. The other end of each section 10 is provided with a transverse cam groove 15. The latch 14 has a projection 18 shaped to cooperate with the cam groove 15. When the ends of the sections 10 are brought together, the latches 14 may be swung transversely of the rim, the projection 18 on the latch of one section coacting with the cam groove 15 on an adjoining section, the ends of the sections being drawn and held tightly together. The rim 9 has inwardly projecting lugs 19 of such a size as to pass through the lateral openings 5 in the felly band 3 and to move circumferentially in the groove 4 of the felly band. A tubular guard 20 projects inwardly from the demountable rim 9, the guard being so called, because it is adapted to receive the valve tube of a tire (not shown). A tongue 21 extends inwardly from the rim 9.

The numeral 23 denotes a keeper having an opening for the reception of the guard 20, the keeper including projections 26 and 27. A stud 30 is mounted in the felly 2 between the openings 6 and passes through the keeper 23, a nut 31 being threaded upon the stud, and being adapted to engage the keeper. The stud 30 and the nut 31 may be denominated a securing device for retaining the keeper 23 in place.

In practical operation, the demountable rim 9 may be slid on the wheel body 1, transversely of the wheel body, the lugs 19 of the rim entering the circumferential groove 4 in the felly band 3, by way of the lateral passages 5. The demountable rim 9 is moved circumferentially of the wheel body 1 in the direction of the arrow in Figure 1, and, thus, the lugs 19 are lodged in the groove 4 so that the rim 9 cannot slide transversely of the wheel body. It will be understood that, previous to sliding the rim 9 transversely of the wheel body, the guard 20 on the demountable rim 9 has been inserted into one of the openings 6 in the wheel body, the tongue 21 having been inserted into the other opening 6. The purpose of the flare at 8 in the openings 6 is to permit the parts 20 and 21 to be inserted into the openings 6, at the top of the wheel.

When the parts are arranged as above described, the keeper 23 is mounted in place, the guard 20 and the stud 30 passing through the keeper. The projection 27 bears against the tubular guard 20 and holds the guard against accidental bending, the guard bearing against the felly 2 at one end of one opening 6. The projection 26 bears against the felly 2 at one end of the other opening 6. The tongue 21, and the part of the felly 2 which lies between the openings 6, are received between the projections 26 and 27, the projections and the tongue and said part of the felly being relatively inclined to take up wear. When the nut 31 is advanced, the keeper 23 is moved outwardly, and the rim 9 is held in the position shown in Figure 1.

Having thus described the invention, what is claimed is:

1. In a device of the class described, a wheel body provided with a circumferential groove and having a lateral passage communicating with the groove, the body having openings; a demountable rim and means for securing the rim on the body, said means comprising a lug on the rim, the lug being insertable into the groove by way of the passage and lodged in the groove upon relative circumferential movement between the body and the rim, the rim including a tongue received in one opening; a keeper including projections extended into the openings, one projection engaging the tongue of the rim; and means for securing the keeper to the wheel body.

2. In a device of the class described, a wheel body provided with a circumferential groove and having a lateral passage communicating with the groove, the body having openings; a demountable rim and means for securing the rim to the body, said means including a lug on the rim, the lug being insertable into the groove by way of the passage and lodged in the groove upon relative circumferential movement between the body and the rim, the rim including a tongue received in one opening, and being provided with a tubular guard received in the other opening; a keeper including projections extended into the openings, one projection engaging the tongue and the other projection engaging the guard; and means for securing the keeper to the wheel body.

3. In a device of the class described, a wheel body provided with a circumferential groove and having a lateral passage communicating with the groove, the body having openings; a demountable rim and means for securing the rim to the body, said means including a lug on the rim, the lug being insertable into the groove by way of the passage and lodged in the groove upon relative circumferential movement between the body and the rim, the rim including a tongue received in one opening, and having a tubular guard received in the other opening; a keeper including projections extended into the openings, one projection engaging the tongue and the other projection engaging the guard, a portion of the guard passing through a portion of the keeper; and a securing device connecting the keeper with the wheel body and located between the projections of the keeper.

4. In a device of the class described, a wheel body provided with a circumferential groove and having a lateral passage communicating with the groove, the body having an opening; a demountable rim and means for securing the rim to the body, said means including a lug on the rim, the lug being insertable into the groove by way of the passage, and lodged in the groove upon relative circumferential movement between the body and the rim, the rim including a tongue received in the opening; a keeper having a projection extended into the opening and engaging the tongue, the projection and the tongue having mutually inclined wedge surfaces operating circumferentially of the wheel body; and means for securing the keeper to the wheel body independently of the projection.

In testimony that I claim the foregoing as my own, I have hereto affixed my signature in the presence of two witnesses.

LEO FEBRE.

Witnesses:
S. V. THOMPSON,
GEO. E. EVANS.